United States Patent
Zuo et al.

(10) Patent No.: US 7,949,976 B2
(45) Date of Patent: May 24, 2011

(54) SYSTEMATIC APPROACH FOR PERFORMING CELL REPLACEMENT IN A CIRCUIT TO MEET TIMING REQUIREMENTS

(75) Inventors: Jingyan Zuo, San Jose, CA (US); Yu-Yen Mo, San Jose, CA (US); Salim Chowdhury, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 468 days.

(21) Appl. No.: 12/125,945

(22) Filed: May 23, 2008

(65) Prior Publication Data
US 2009/0293029 A1     Nov. 26, 2009

(51) Int. Cl.
*G06F 17/50*     (2006.01)
*G06F 9/455*     (2006.01)
(52) U.S. Cl. ........ 716/113; 716/101; 716/106; 716/108; 716/111; 716/134; 716/136; 716/139
(58) Field of Classification Search .................. 716/1, 2, 716/4–6, 8, 10, 11
See application file for complete search history.

(56) References Cited

U.S. PATENT DOCUMENTS

| | | | | |
|---|---|---|---|---|
| 7,325,210 | B2 * | 1/2008 | Rao et al. | 716/6 |
| 7,571,340 | B2 * | 8/2009 | Jiang | 713/500 |
| 2006/0050827 | A1 * | 3/2006 | Saeki et al. | 375/362 |
| 2008/0238519 | A1 * | 10/2008 | Kapoor | 327/297 |
| 2009/0217225 | A1 * | 8/2009 | Sunder et al. | 716/6 |

OTHER PUBLICATIONS

Kuo, Chien-Chu, et al., "Delay budgeting for a timing-closure-driven design method", International Conference on Computer Aided Design, 2000, 6 pages.

Kung, H.T., et al., "On finding the maxima of a set of vectors", Journal of the Associating of Computing Machinery, vol. 22, No. 4, Oct. 1975, 8 pages.

* cited by examiner

*Primary Examiner* — Helen Rossoshek
(74) *Attorney, Agent, or Firm* — Osha Liang LLP

(57) ABSTRACT

An improved, systematic approach is provided for automatically determining which cells in a circuit should be replaced to satisfy timing adjustment requirements (TAR's), and automatically replacing the cells with replacement cells to meet the TAR's. With the improved approach, there is a high likelihood that an optimal replacement scheme will be found which requires the fewest number of cells to be replaced while still satisfying all of the TAR's.

18 Claims, 6 Drawing Sheets

SYSTEMATIC APPROACH FOR PERFORMING CELL REPLACEMENT IN A CIRCUIT TO MEET TIMING REQUIREMENTS

BACKGROUND

In the process of designing a circuit, a circuit designer may insert buffers between signal sources and sinks (where signal sources are components that originate signals and sinks are components that receive the signals). Such buffers serve to accelerate the propagation of the signals so that the signals arrive at the sinks faster, and they also serve to reduce signal transition time, which in turn, improves slew rate. Through the addition of buffers, a circuit designer makes it possible for the circuit to meet various timing requirements.

After buffer insertion, a timing analysis is often performed on the resulting circuit. After such timing analysis is performed, it is often discovered that certain hold time constraints are violated. Put another way, it is often discovered that the signals have been accelerated too much so that they arrive at the sinks too fast; as a result, the hold time requirements of certain components (e.g. flip flops) are violated. In such a case, the circuit has to be revised to rectify the hold time violations.

One possible approach to revising the circuit is to insert one or more delay elements close to each of the sinks at which there is a hold time violation. These delay elements serve to delay signal propagation, which in turn, prevents the signal from arriving at the sink too early. While this approach may solve the timing violation problem, it often requires significant work and resources, including determining where the delay elements may be legally placed (without overlapping with existing blocks and gates), re-extraction of RC parasitics, and another round of timing analysis. This can add significant uncertainty to the finalization of the circuit design. Another approach that can be taken is for the circuit designer to re-do the buffer insertion process (e.g. re-analyze the circuit and put different buffers in different places in the circuit). Again, while this may eventually solve the timing violation problem, it requires significant effort and considerable amounts of resources, which add cost and delay to the design process. Besides, hold time analysis and timing violation removal are often performed near the end of a design cycle; thus, only incremental changes are usually allowed at this stage. Hence, re-doing the buffer insertion process is not a preferable approach to fixing hold time violations.

A more desired approach to solving the timing violation problem is to use the current circuit design with the current buffer insertions, and to swap or replace certain buffers with other buffers having different timing characteristics. For example, if an additional delay of 5 picoseconds (ps) is required, then a repeater (which is a type of buffer) having a delay of 15 ps may be replaced with a repeater having a 20 ps delay. Component replacement is often simpler from a design standpoint because it usually does not involve any placement or physical design considerations. Because of this, component replacement is often the approach of choice.

Currently, component replacement is carried out manually by the circuit designer. That is, the circuit designer analyzes the circuit design, makes an educated guess as to which components should be replaced with which other components to rectify the timing violations, and then performs the component replacements in the circuit design. This ad hoc approach to component replacement is problematic because it is labor intensive, error prone, and not likely to produce an optimal solution in which the least number of components are replaced. Because of these shortcomings, an improved approach is needed for implementing component replacement.

SUMMARY

In accordance with one embodiment of the present invention, an improved, systematic approach is provided for automatically determining which cells in a circuit should be replaced to satisfy timing adjustment requirements (TAR's), and automatically replacing the cells with replacement cells to meet the TAR's. As used herein, the term "cell" refers broadly to any component that processes or acts on a signal (thereby, imposing a delay on the signal). Examples of cells include, but certainly are not limited to, buffers, repeaters, inverters, delay repeaters, SVT (standard threshold voltage) repeaters, LVT (lower threshold voltage) repeaters, etc. With the improved approach, there is a high likelihood that an optimal replacement scheme will be found which requires the fewest number of cells to be replaced while still satisfying all of the TAR's.

In one embodiment, cell replacement is performed as follows. Initially, a set of information that defines a circuit is accessed. This circuit may be a complete circuit, or it may be part of a larger circuit. In one embodiment, this circuit comprises a signal source, a plurality of sinks, one or more cells, and a plurality of paths coupling the signal source to each of the sinks. At least a subset of the paths comprises one or more of the cells. In one embodiment, this circuit represents a circuit design in which one or more cells (e.g. repeaters, inverters, etc.) have been inserted into the design between the signal source and the one or more sinks.

Based at least partially upon the circuit, a tree structure is constructed. The tree structure has the signal source represented as a root node, has each sink represented as a leaf node, has a branch connecting each leaf node to the root such that each branch represents a path, and has each cell in a path represented as an intervening node in a branch. In one embodiment, one or more of the leaf nodes (which represent the sinks) may have a TAR associated therewith. A TAR associated with a leaf node indicates what type and how much of a timing adjustment is needed on the branch that connects that leaf node to the root. In one embodiment, a TAR may indicate that additional delay is needed on a branch, or it may indicate that delay reduction is needed on the branch (thus, this approach may be used to add or reduce delay in a branch).

Once the tree structure is constructed, it may be used to determine which cells in the circuit should be replaced with a replacement cell. In one embodiment, this determination is made by propagating the TAR's upstream from the leaf nodes towards the root. Specifically, for at least one leaf node that has an associated TAR, the TAR from that leaf node is propagated towards the root along a branch that connects that leaf node to the root. As part of the propagation process, at least a portion of the TAR is assigned to one or more intervening nodes on that branch. In one embodiment, this is done for each leaf node having a TAR associated therewith. At the end of the propagation process, there will be one or more intervening nodes to which at least a portion of a TAR has been assigned. Each of these intervening nodes represents a targeted cell to be replaced (recall that each intervening node represents a corresponding cell). In this manner, the cells to be replaced are identified.

Thereafter, for at least one intervening node to which at least a portion of a TAR has been assigned, the cell in the circuit represented by that intervening node is replaced with a replacement cell having timing characteristics that satisfy all or part of the TAR that was assigned to that intervening node. For example, if the TAR indicates that more delay is needed, then the cell is replaced with a replacement cell that imposes more delay. On the other hand, if the TAR indicates that delay reduction is required, then the cell is replaced with a replacement that imposes less delay. In one embodiment, cell replacement is performed for each intervening node to which at least a portion of a TAR has been assigned, and is implemented starting with the intervening node(s) closest to the root and proceeding downstream to the intervening nodes closer to the leaf nodes. In one embodiment, if a replacement cell is not able to satisfy all of the TAR that was assigned to a particular intervening node, then the remainder of the assigned TAR is assigned to an intervening node that is downstream from the particular intervening node. Thus, unsatisfied portions of TAR's are passed downstream.

By propagating TAR's upstream from the leaf nodes to the root to identify the cells to be replaced, and by replacing the cells and passing TAR remainders downstream in the manner described above, this approach is able to systematically and automatically determine which cells in a circuit should be replaced to satisfy a set of TAR's, and to perform the actual replacement of the cells to satisfy the TAR's.

DETAILED DESCRIPTION OF EMBODIMENT(S)

Overview

Figure 1:
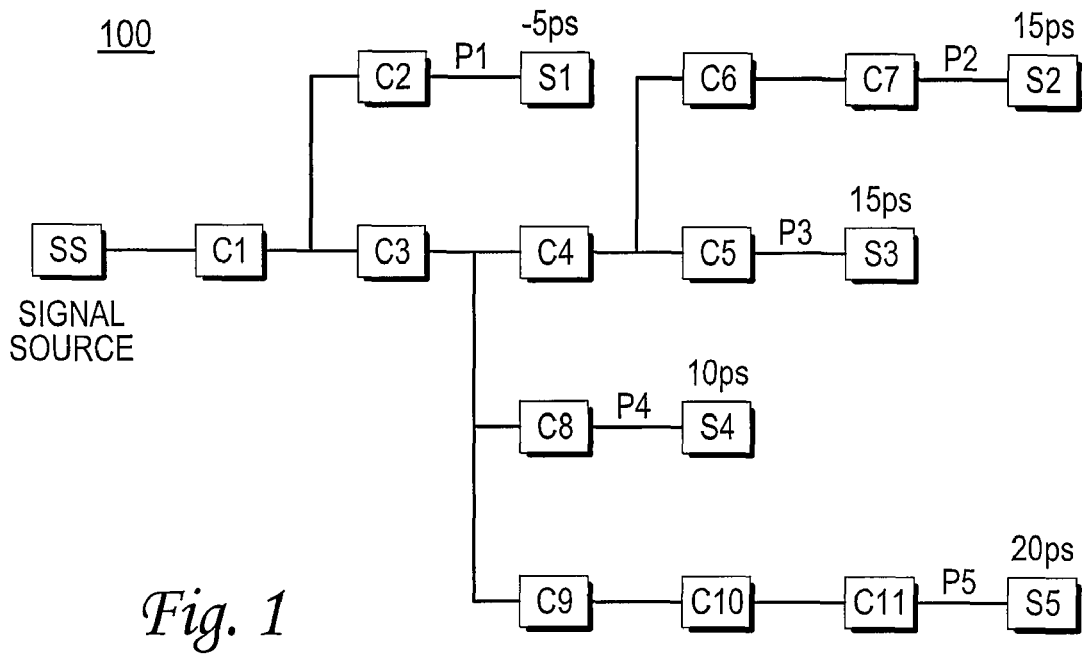
FIG. 1 depicts a sample circuit that may be processed by an embodiment of the present invention.

Cells are inserted into many circuits to satisfy the various timing requirements of those circuits. As noted previously, the term "cell" is used broadly herein to refer to any component that processes or acts on a signal (thereby, imposing a delay on the signal). Examples of cells include, but certainly are not limited to, buffers, repeaters, inverters, delay repeaters, SVT (standard threshold voltage) repeaters, LVT (lower threshold voltage) repeaters, etc. Many circuits into which cells are inserted take the form of a network (also referred to herein as a net). An example of such a net is shown in FIG. 1. As shown, sample net 100 comprises a signal source SS and a plurality of sinks (S1 through S5). Each sink is coupled to the signal source SS by a path (P1 through P5), and each path may comprise zero or more cells (C1 through C11). In the sample net 100 of FIG. 1, path P1, which couples sink S1 to the signal source SS, includes cells C2 and C1. Path P2, which couples sink S2 to signal source SS, includes cells C7, C6, C4, C3, and C1. Path P3, which couples sink S3 to signal source SS, includes cells C5, C4, C3, and C1. Path P4, which couples sink S4 to signal source SS, includes cells C8, C3, and C1, and path P5, which couples sink S5 to signal source SS, includes cells C11, C10, C9, C3, and C1.

When timing analysis is performed on such a net 100 after cell insertion has been carried out, it is often discovered that certain timing requirements are violated by one or more of the paths. These timing violations may be characterized as one or more timing adjustment requirements (TAR's). A TAR may be associated with a sink, and indicates that some delay adjustment is needed on the path that couples that sink to the signal source. For example, in FIG. 1, a TAR of −5 ps is associated with sink S1. This TAR (by the fact that it is a negative value) indicates that sink S1 needs the delay on path P1 to be reduced by 5 ps in order for the timing requirements of the sink S1 to be satisfied. Similarly, a TAR of 15 ps is associated with sink S2. This TAR (by the fact that it is a positive value) indicates that sink S2 needs the delay on path P2 to be increased by 15 ps in order for the timing requirements of the sink S2 to be satisfied. Given the TAR's, it is known what timing adjustments need to be made for each of the paths.

To satisfy a TAR associated with a sink, all or a portion of the TAR may be assigned to one or more cells on the path that couples that sink to the signal source SS. For example, to satisfy the 15 ps TAR associated with sink S2, all or a portion of the TAR may be assigned to one or more of the cells (C7, C6, C4, C3, C1) on the path P2 that couples sink S2 to signal source SS. Just as an example, 10 ps may be assigned to cell C6 and 5 ps may be assigned to cell C7. When all of a portion of a TAR is assigned to a cell, it means that that cell should be replaced with a replacement cell having a delay which is commensurate with the assigned TAR. For example, if 10 ps is assigned to cell C6, it means that cell C6 should be replaced with a replacement cell having a delay that is 10 ps greater than the delay of the current cell C6. The opposite is true for a delay reduction. For example, if −5 ps is assigned to cell C2, it means that cell C2 should be replaced with a replacement cell having a delay that is 5 ps less than the delay of the current cell C2. By assigning all or a portion of each TAR to one or more cells, all of the TAR's associated with all of the sinks can be satisfied.

In assigning the various TAR's to the various cells, there are many possible choices and combinations. For example, to satisfy the 15 ps TAR of sink 2, it is possible to assign 10 ps to cell C6 and 5 ps to cell C7. Likewise, to satisfy the 15 ps TAR of sink S3, it is possible to assign 15 ps to cell C5. While these assignments may be possible, they may not be optimal from the standpoint of minimizing the number of cells that need to be replaced. For example, it may be better not to assign any of the TAR's to cells C5, C6, or C7 at all, but rather to assign 15 ps to cell C4. Since cell C4 is common to both paths P2 and P3, this single replacement of cell C4 may be all that is needed to satisfy the TAR's for both paths. As this discussion shows, for purposes of minimizing the number of cells that need to be replaced, it is advantageous to exploit cells that are common to multiple paths. In accordance with this observation, one embodiment of the present invention determines which cells are common to multiple paths, and assigns as much TAR to those cells as possible. By doing so, the number of cells that need to be replaced can be minimized. The manner in which this may be done in accordance with one embodiment of the present invention will be described in a later section. Suffice it to say at this point that, in one embodiment, the various TAR's associated with the various sinks are propagated upstream from the sinks, through the intervening cells, to the signal source SS, and as part of the propagation process, all or portions of the TAR's are assigned to one or more of the intervening cells. At the end of this propagation process, one or more cells will have all or a portion of a TAR assigned to it. These cells are the ones that should be replaced.

After the cells to be replaced are identified, cell replacement is performed. In one embodiment, cell replacement starts from the cells closest to the signal source SS and proceeds downstream towards the sinks. Thus, in the sample net 100, cell replacement starts with cell C1. If any TAR portion is assigned to this cell, then this cell will be replaced with a replacement cell having a delay that is commensurate with the assigned TAR portion. Cell replacement then continues with cells C2 and C3. If any TAR portion is assigned to these cells, then these cells will be replaced with replacement cells having delays that are commensurate with the assigned TAR portions. Thereafter, cell replacement continues with cells C4, C8, and C9. This downstream replacement process continues until all of the identified cells are replaced. In this manner, the TAR's are satisfied.

In some instances, it may not be possible for a single cell replacement to satisfy the entire TAR amount that has been assigned to a cell. For example, suppose that 10 ps has been assigned to cell C3. Suppose further that there is no available cell that has a 10 ps greater delay than the current cell C3. Thus, it is not possible to replace cell C3 with a replacement cell that satisfies the entire 10 ps TAR assignment. In such a case, in one embodiment, the cell is replaced with a replacement cell that satisfies as much of the assigned TAR as possible, and the remainder of the TAR assignment is passed downstream to another cell. Thus, suppose that a replacement cell is available which has a delay that is 5 ps greater than the current cell C3. Cell C3 will be replaced with this replacement cell, and the remaining 5 ps TAR is passed downstream. In the sample net 100, cell C3 is a common cell which is common to paths P3, P4, and P5. Thus, the remaining 5 ps TAR will be passed downstream to a cell on each of these paths. Specifically, the 5 ps remaining TAR will be passed to cells C4, C8, and C9. Notice that this may cause a cell to be replaced that previously was not identified as being a cell to be replaced. For example, if 10 ps of TAR was assigned to cell C3, then cell C8 previously did not have any TAR assigned to it; thus, cell C8 was not previously identified as a cell to be replaced. However, since the 5 ps remaining TAR is now being passed down from cell C3 to cell C8, cell C8 is now identified as a cell that needs to be replaced. As this example shows, not only can a TAR be propagated upstream, it can also be passed downstream.

By propagating TAR's upstream and performing cell replacements downstream in the manner discussed above, one embodiment of the present invention enables cell replacement to be carried out in a systematic and automatic manner. With this approach, there is a high likelihood that an optimal replacement scheme will be found which requires the fewest number of cells to be replaced while still satisfying all of the TAR's.

Cell Replacement Mechanism

In accordance with one embodiment of the present invention, a cell replacement mechanism (CRM) is provided for implementing the functionality discussed above and described in greater detail below. For purposes of the present invention, the CRM may be implemented in any desired manner using any desired technology. In one embodiment, the CRM is realized using software; that is, the functionality of the CRM is derived by having one or more processors execute one or more sets of instructions. Alternatively, the CRM may be implemented in hardware, wherein the functionality and the logic of the CRM are realized using hardware logic components (e.g. one or more ASIC's, one or more field programmable logic arrays, etc.). These and other implementations of the CRM are within the scope of the present invention.

Operational Overview of the CRM

Figure 3:
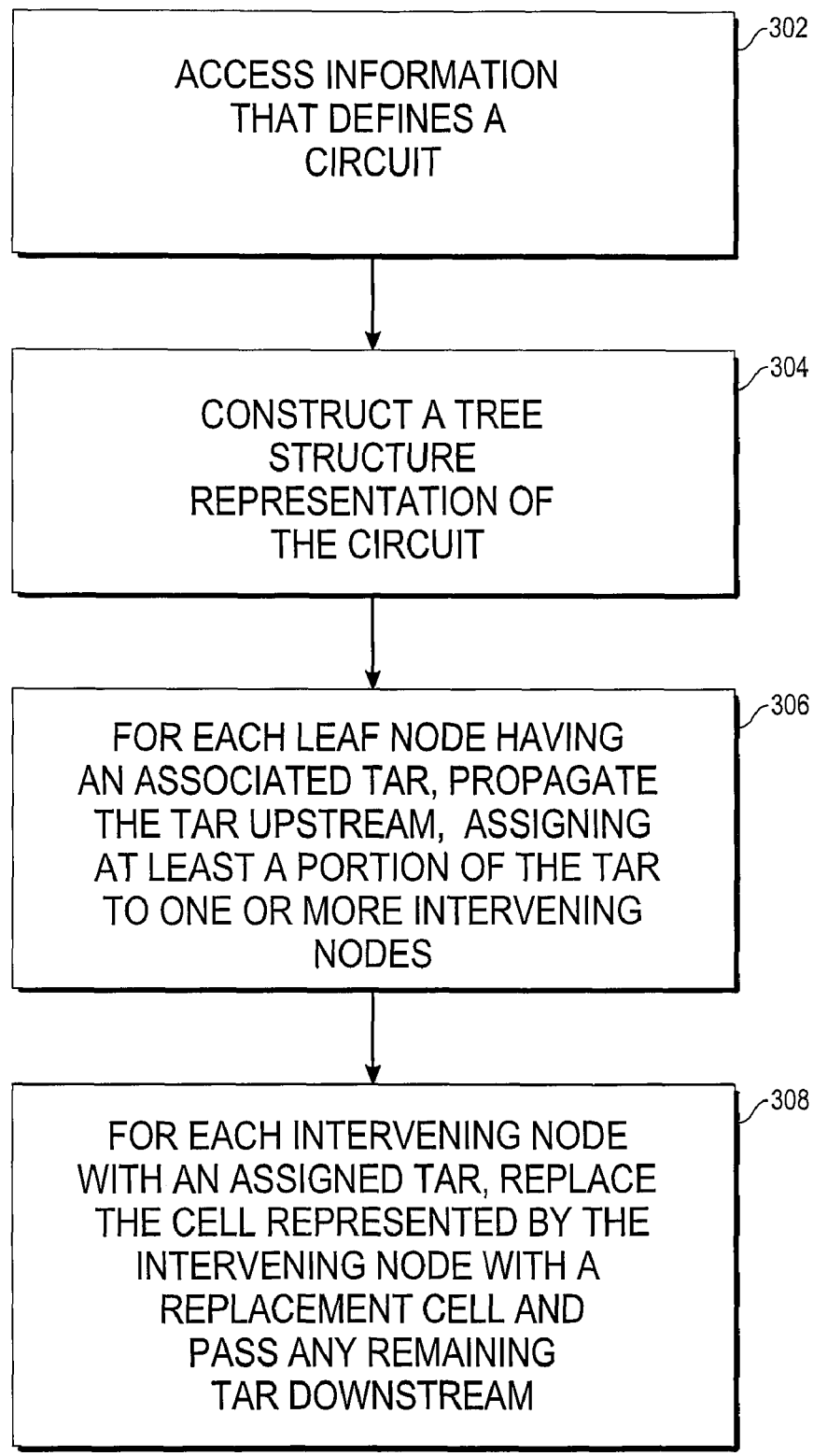
FIG. 3 shows a high level operational flow diagram for a cell replacement mechanism, in accordance with one embodiment of the present invention.

FIG. 3 shows a high level operational flow diagram for the CRM in accordance with one embodiment of the present invention. With reference to FIG. 3, a high level description of the operation of the CRM will now be provided.

Initially, the CRM accesses (block 302) a set of information that defines a circuit (this circuit may be a complete circuit, or it may be part of a larger circuit). This set of information (which, for example, may take the form of a netlist) includes all of the information needed to completely define and describe the circuit. For example, the set of information may include information pertaining to a signal source, information pertaining to each of a plurality of sinks, information pertaining to each of one or more cells (e.g. information describing the structure of the cells, timing and delay information for the cells, parasitic information for the cells, etc.), and interconnect information specifying the manner in which all of the elements of the circuit are coupled together (e.g. information specifying which element is connected to which other element(s), parasitic information pertaining to the interconnects, etc.). With this information, it is possible for the CRM to determine the complete makeup of the circuit, which path connects which sink to the signal source, and which cell or cells lie along which path.

In addition to the information set forth above, the set of accessed information may further comprise information pertaining to replacement cells that may be selected to replace the cells that are currently in the circuit. The information pertaining to the replacement cells may include information describing the structure of the cells, timing and delay information for the cells, parasitic information for the cells, etc.

The set of accessed information may further comprise information indicating what, if any, TAR is needed for each sink. In one embodiment, the TAR's are determined based upon a timing analysis, and are provided as part of the information for the circuit. As noted previously, a TAR may indicate that additional delay is required for a sink or that delay reduction is required for a sink. In one embodiment, the CRM is able to handle either/both delay addition and delay reduction. A TAR may be specified as a range. For example, a TAR may indicate that at least an X amount of additional delay is needed for a sink but the additional delay should not exceed Y. Similarly, a TAR may indicate that at least an X amount of delay reduction is needed for a sink but the reduction should not exceed Y. These and other types of information may be included in the set of accessed information.

Based at least partially upon the set of accessed information, the CRM constructs (block 304) a tree structure representation for the circuit. In one embodiment, the tree structure is constructed such that it has the signal source represented as a root node, has each sink represented as a leaf node, has a branch connecting each leaf node to the root such that each branch represents a path, and has each cell in a path represented as an intervening node in a branch. In addition, in one embodiment, the CRM associates each TAR with a corresponding leaf node (which represents a corresponding sink).

After constructing the tree structure, the CRM uses it to determine which cells in the circuit should be replaced with a replacement cell. In one embodiment, this determination is made by propagating (block 306) each of the TAR's upstream from the leaf nodes, through the intervening nodes, to the root. Specifically, for each leaf node that has an associated TAR, the TAR from that leaf node is propagated towards the root along a branch that connects that leaf node to the root. As part of the propagation process, at least a portion of the TAR is assigned to one or more intervening nodes on that branch. At the end of the propagation process, there will be one or more intervening nodes to which at least a portion of a TAR has been assigned. Each of these intervening nodes represents a cell to be replaced (recall that each intervening node represents a corresponding cell). In this manner, the targeted cells to be replaced are identified.

Thereafter, the CRM proceeds to perform the actual cell replacements (block 308). Specifically, for each intervening node to which at least a portion of a TAR has been assigned, the CRM replaces the cell in the circuit represented by that intervening node with a replacement cell having timing characteristics that satisfy all or part of the TAR that was assigned to that intervening node. For example, if the TAR indicates that more delay is needed, then the cell is replaced with a replacement cell that imposes more delay. On the other hand, if the TAR indicates that delay reduction is required, then the cell is replaced with a replacement that imposes less delay. In one embodiment, the CRM tries to select a replacement cell that completely satisfies the TAR assigned to the intervening node. If such a cell is not available, then the CRM selects a replacement cell that comes closest to completely satisfying the assigned TAR.

In one embodiment, cell replacement is implemented starting with the intervening node(s) closest to the root and proceeding downstream to the intervening nodes closer to the leaf nodes. In one embodiment, if a replacement cell is not able to satisfy all of the TAR that was assigned to a particular intervening node, then the remainder of the assigned TAR is assigned to an intervening node that is downstream from the particular intervening node. Thus, unsatisfied portions of TAR's are passed downstream.

By propagating TAR's upstream and performing cell replacements downstream in the manner described above, the CRM systematically and automatically carries out cell replacement for a circuit. With this approach, there is a high likelihood that the CRM will find an optimal replacement scheme that requires the fewest number of cells to be replaced while still satisfying all of the TAR's.

Detailed Sample Operation

The above discussion provides a high level overview of the manner in which the CRM operates in accordance with one embodiment of the present invention. To describe the operation of the CRM in greater detail, reference will now be made to an example. In the following discussion, it will be assumed that the CRM is processing the sample circuit 100 shown in FIG. 1.

Initially, the CRM accesses a set of information that completely describes the sample circuit 100. This set of information may, for example, take the form of a netlist. In one embodiment, the set of information also comprises information indicating the TAR's that are associated with the sinks. Thus, given this information, the CRM can determine that sink S1 has a TAR of −5 ps associated therewith, sink S2 has a TAR of 15 ps associated therewith, and so on. In one embodiment, the set of information further comprises information pertaining to the replacement cells that the CRM can choose from to replace the cells currently in the sample circuit 100.

Figure 2A:
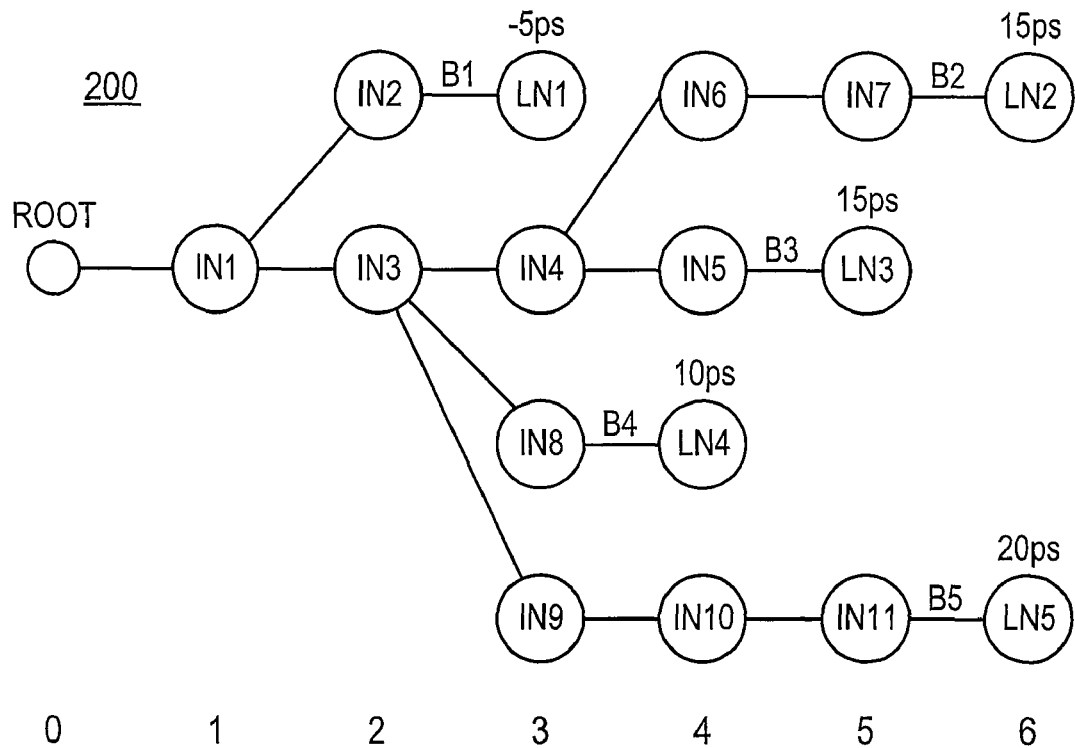
FIGS. 2A-2G illustrate a sample tree structure constructed in accordance with one embodiment of the present invention, and show how that tree structure may be used to implement a cell replacement methodology in accordance with one embodiment of the present invention.

Based at least partially upon the set of accessed information, the CRM constructs a tree structure to represent the sample circuit 100. In one embodiment, the CRM constructs the tree structure such that the tree structure has the signal source SS represented as a root node, has each sink represented as a leaf node, has a branch connecting each leaf node to the root such that each branch represents a path, and has each cell in a path represented as an intervening node in a branch. A sample tree structure 200 that may be constructed for the sample circuit 100 is shown in FIG. 2A. In the tree structure of FIG. 2A, the signal source SS is represented as the root of the tree, sinks S1 through S5 are represented as leaf nodes LN1 through LN5, respectively, cells C1 through C11 are represented as intervening nodes IN1 through IN11, respectively, and paths P1 through P5 are represented as branches B1 through B5, respectively. Each of the leaf nodes LN1 through LN5 have a TAR associated therewith. These TAR's are the same as those that were associated with the sinks S1 through S5.

In one embodiment, the tree structure 200 is levelized, meaning that a level is assigned to each node, where the level indicates how far removed a node is relative to the root. Thus, as shown in FIG. 2A, the root is at level 0, IN1 is at level 1, IN2 and IN3 are at level 2, LN1, IN4, IN8, and IN9 are at level 3, IN6, IN5, LN4, and IN10 are at level 4, IN7, LN3, and IN11 are at level 5, and LN1 and LN5 are at level 6.

After the tree structure 200 is constructed, the CRM proceeds to use the tree structure 200 to propagate the TAR's. In one embodiment, the CRM begins the TAR propagation process with nodes at the highest level. In the current example, the highest level is level 6, and LN2 and LN5 are both at this level; thus, the CRM begins the TAR propagation process with these nodes.

Figure 2B:
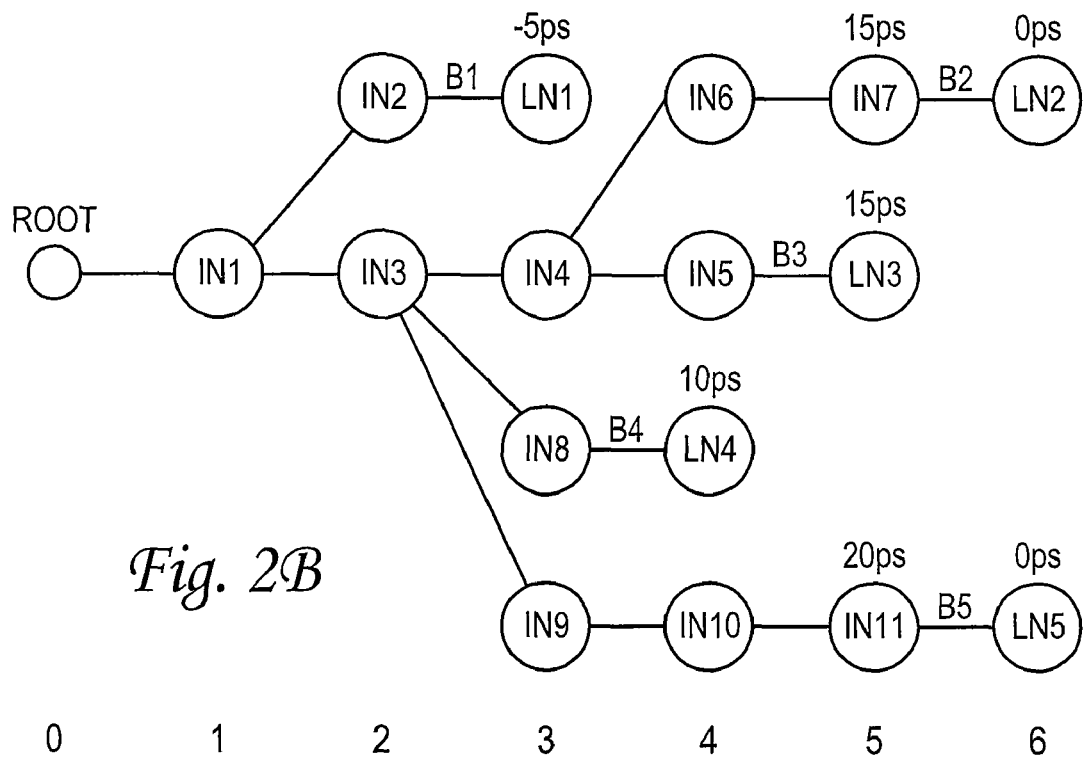

With regard to LN2, the CRM finds the next parent node on the branch that connects LN2 to the root. In the current example, the branch that connects LN2 to the root is branch B2, and the next parent node is node IN7. After the next parent node is found, the CRM determines how much TAR to propagate to that node. In one embodiment, the CRM makes this determination by determining whether the next parent node is a common node that is common to multiple branches. In the current example, IN7 is not a common node. In such a case, the CRM, in one embodiment, propagates all of the 15 ps TAR from LN2 to IN7, leaving LN2 with 0 TAR. This result is shown in FIG. 2B.

Similarly, with regard to LN5, the CRM finds the next parent node on the branch that connects LN5 to the root. In the current example, this would be node IN11 on branch B5. The CRM then determines whether node IN11 is a common node. In the current example, IN11 is not a common node; thus, the CRM propagates all of the 20 ps TAR from LN5 to IN11, leaving LN5 with 0 TAR. This result is also shown in FIG. 2B. Propagation of the TAR at level 6 is now completed.

Figure 2C:
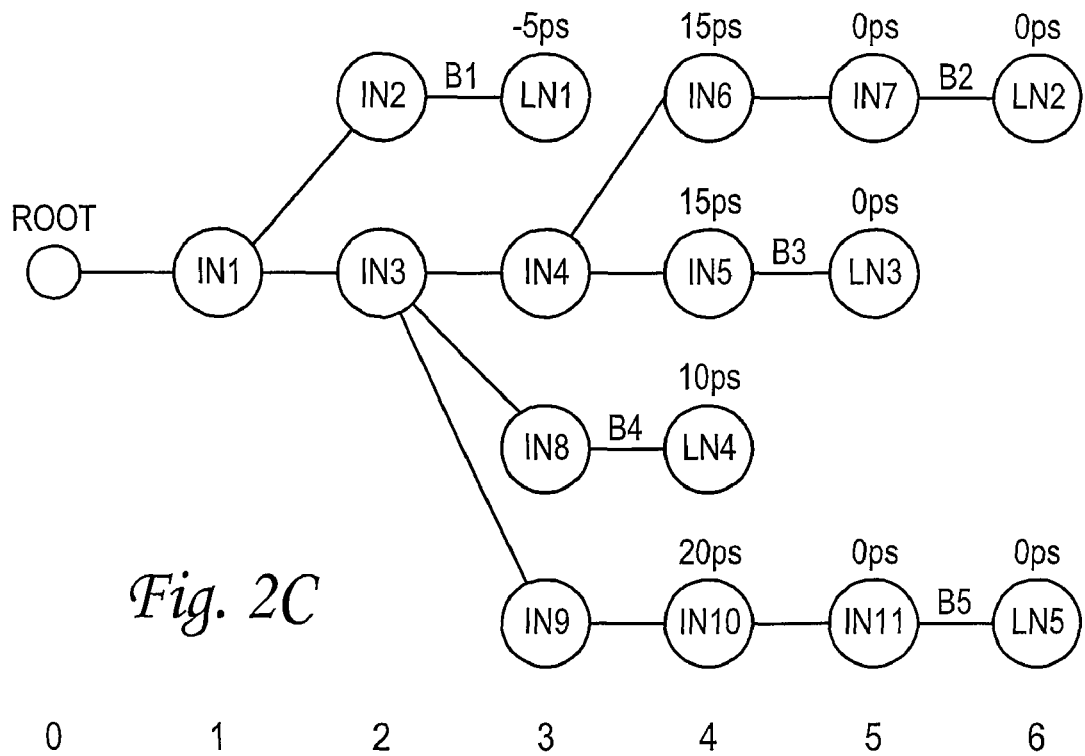

The CRM now proceeds to level 5. IN7, LN3, and IN11 are at this level. With regard to IN7, the CRM finds the next parent node, which is node IN6, and determines whether that node is a common node. In the current example, IN6 is not a common node; thus, the CRM propagates all 15 ps of the TAR from IN7 to IN6, leaving IN7 with 0 TAR. This result is shown in FIG. 2C. With regard to LN3, the CRM finds the next parent node, which is node IN5, and determines whether that node is a common node. In the current example, IN5 is not a common node; thus, the CRM propagates all 15 ps of the TAR from LN3 to IN5, leaving LN3 with 0 TAR. This result is also shown in FIG. 2C. With regard to IN11, the CRM finds the next parent node, which is node IN10, and determines whether that node is a common node. In the current example, IN10 is not a common node; thus, the CRM propagates all 20 ps of the TAR from IN11 to IN10, leaving IN11 with 0 TAR. This result is also shown in FIG. 2C. Propagation of the TAR at level 5 is now completed.

The CRM then proceeds to level 4. IN6, IN5, LN4, and IN10 are at this level. With regard to IN6, the CRM finds the next parent node, which is node IN4, and determines whether that node is a common node. In the current example, IN4 is a common node that is common to branches B2 and B3. In such a case, the CRM does not automatically propagate all of the TAR from IN6 to IN4. Instead, the CRM, in one embodiment, determines how much, if any, of the TAR should be propagated based upon the needs of the multiple branches.

In one embodiment, this determination is made as follows. Initially, the CRM determines a TAR quantity for each of the branches to which the node is common, wherein the TAR quantity for a branch indicates how much TAR that branch has to propagate. In the current example, node IN6 on branch B2 has 15 ps of TAR to propagate and node IN5 on branch B3 also has 15 ps of TAR to propagate; thus, the TAR quantity for both branches is 15 ps.

Figure 2D:
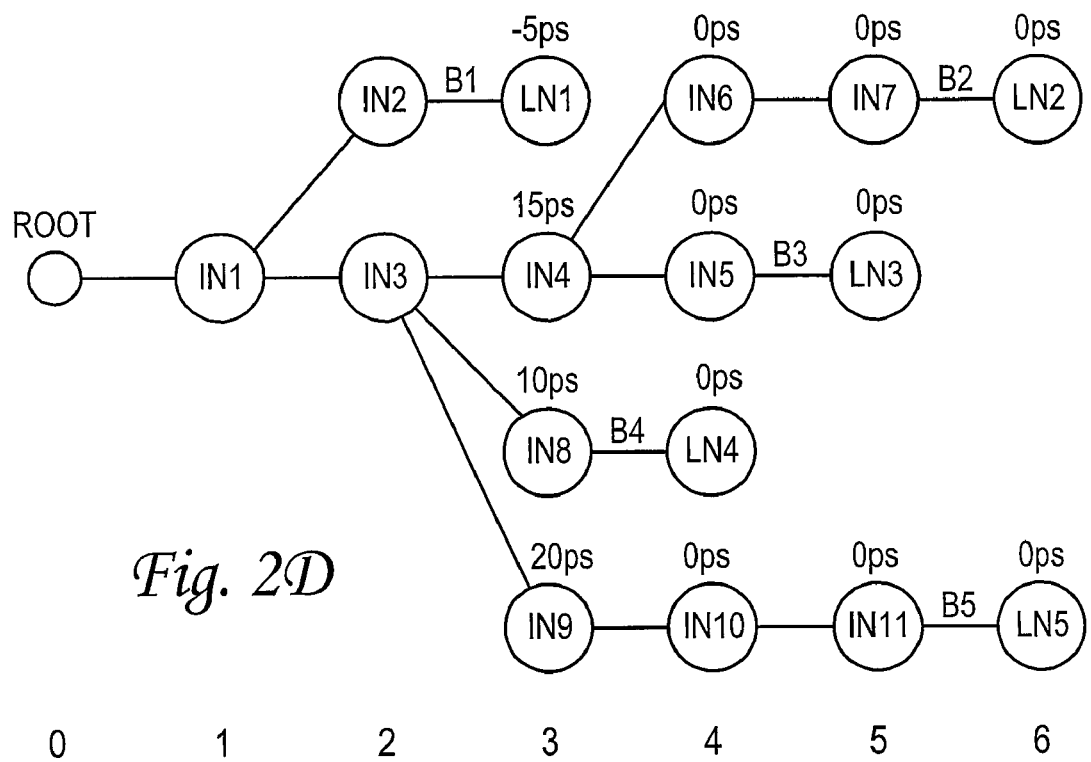

After the TAR quantities for the branches are determined, the CRM determines, based upon the TAR quantities, how much TAR to propagate to the next parent node. In one embodiment, if all of the TAR quantities indicate that additional delay is required (e.g. all of the TAR quantities are positive), the CRM selects the TAR quantity that calls for the least amount of additional delay, and propagates that amount of TAR to the next parent node (e.g. if the TAR quantities are 10 ps and 20 ps, the CRM will propagate 10 ps to the next parent node). If all of the TAR quantities indicate that delay reduction is required (e.g. all of the TAR quantities are negative), the CRM selects the TAR quantity that calls for the least amount of delay reduction, and propagates that amount of TAR to the next parent node (e.g. if the TAR quantities are −5 ps and −10 ps, the CRM will propagate −5 ps to the next parent node). If the TAR quantities indicate a mix of requiring additional delay and delay reduction, the CRM propagates zero TAR to the next parent node (e.g. if one or more TAR quantities are negative and one or more TAR quantities are positive, the CRM will propagate zero TAR to the next parent node). In the current example, both TAR quantities are 15 ps; thus, the CRM propagates 15 ps to IN4, leaving both IN6 and IN5 with 0 TAR. This result is shown in FIG. 2D.

With regard to LN4, the CRM finds the next parent node, which is node IN8, and determines whether that node is a common node. In the current example, IN8 is not a common node; thus, the CRM propagates all 10 ps of the TAR from LN4 to IN8, leaving LN4 with 0 TAR. This result is also shown in FIG. 2D. With regard to IN10, the CRM finds the next parent node, which is node IN9, and determines whether that node is a common node. In the current example, IN9 is not a common node; thus, the CRM propagates all 20 ps of the TAR from IN10 to IN9, leaving IN10 with 0 TAR. This result is also shown in FIG. 2D. Propagation of the TAR at level 4 is now completed.

Figure 2E:
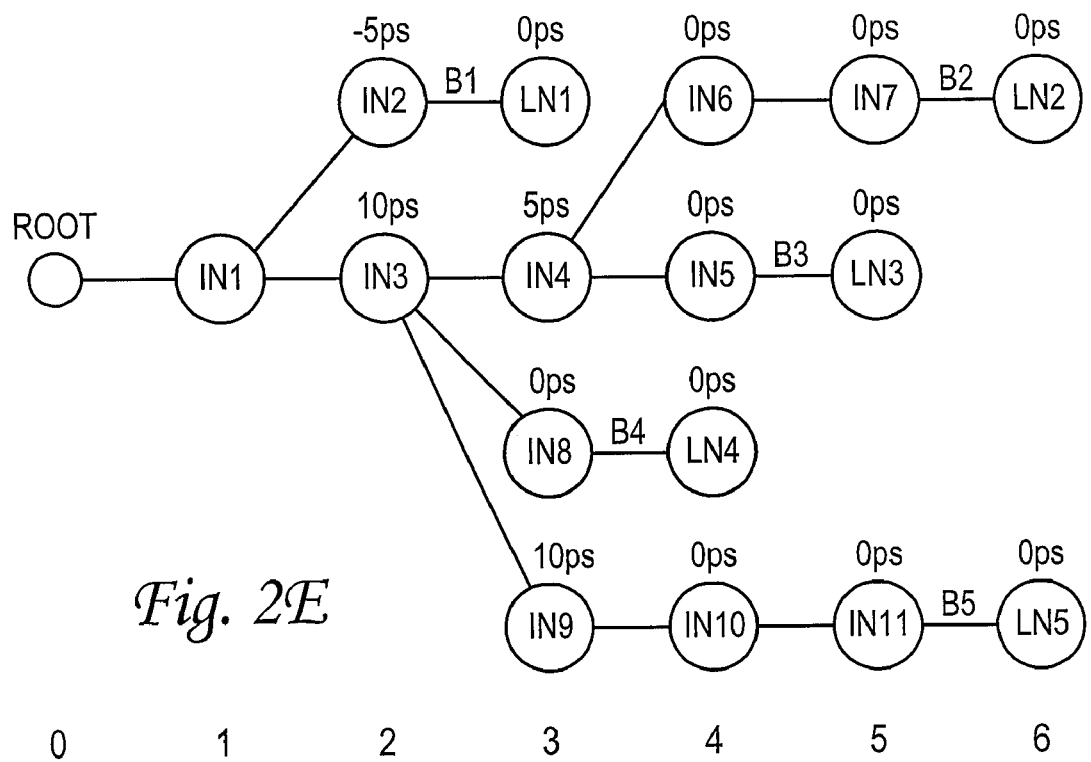

The CRM then proceeds to level 3. LN1, IN4, IN8, and IN9 are at this level. With regard to LN1, the CRM finds the next parent node, which is node IN2, and determines whether that node is a common node. In the current example, IN2 is not a common node; thus, the CRM propagates all −5 ps of the TAR from LN1 to IN2, leaving LN1 with 0 TAR. This result is shown in FIG. 2E.

With regard to IN4, the CRM finds the next parent node, which is node IN3, and determines whether that node is a common node. In the current example, IN3 is a common node that is common to branches B3, B4, and B5. That being the case, the CRM determines a TAR quantity for each of the branches. In the current example, node IN4 on branch B2/B3 (see FIG. 2D) has 15 ps of TAR to propagate, node IN8 on branch B4 has 10 ps of TAR to propagate, and node IN9 on branch B5 has 20 ps of TAR to propagate. Since all of these TAR quantities indicate that additional delay is required, the CRM selects the TAR quantity that calls for the least amount of additional delay which, in the current example, is 10 ps. Thus, the CRM propagates 10 ps of TAR to node IN3. With 10 ps propagated to IN3, node IN 4 is left with 5 ps of TAR, node IN8 is left with Ops of TAR, and node IN9 is left with 10 ps of TAR. This result is shown in FIG. 2E. Propagation of the TAR at level 3 is now completed.

The CRM then proceeds to level 2. IN2 and IN3 are at this level. With regard to IN2, the CRM finds the next parent node, which is node IN1, and determines whether that node is a common node. In the current example, IN1 is a common node that is common to branches B1 and B3. That being the case, the CRM determines a TAR quantity for each of the branches. In the current example, node IN2 on branch B1 has −5 ps of TAR to propagate and node IN3 on branch B3 has 10 ps of TAR to propagate. Since these TAR quantities indicate a mixture of additional delay and delay reduction, the CRM does not propagate any TAR to the next parent node; thus, 0 TAR is propagated to IN1. Propagation of the TAR at level 2 is now completed. In one embodiment, it is not possible to propagate any TAR from a level 1 node to the root; thus, no more TAR propagation needs to be done. At this point, the intervening nodes that have TAR's assigned to them are IN2, IN3, IN4, and IN9. It is the cells (namely, cells C2, C3, C4, and C9) that are represented by these intervening nodes IN2, IN3, IN4, and IN9 that are targeted to be replaced.

After the cells to be replaced are identified, the CRM proceeds to perform cell replacement in the sample circuit 100. In one embodiment, the CRM starts with the nodes at level 1. In the current example, no TAR has been assigned to node IN1; thus, no cell replacement is performed for that node. At level 2, both nodes IN2 and IN3 have TAR's assigned to them. Thus, cell replacement is performed for both of these nodes. To do so, the CRM, in one embodiment, accesses the information pertaining to the cell C2 that is represented by node IN2. From this information, the CRM determines a delay imposed by the cell. The CRM then accesses the information pertaining to the replacement cells, and determines whether there is a replacement cell that imposes a delay of 5 ps less than the delay imposed by the current cell C2. Assuming that there is such a replacement cell, the CRM replaces the current cell C2 with the replacement cell in sample circuit 100. Likewise, for node IN3, the CRM accesses the information pertaining to the cell C3 that is represented by node IN3. From this information, the CRM determines a delay imposed by the cell. The CRM then accesses the information pertaining to the replacement cells, and determines whether there is a replacement cell that imposes a delay of 10 ps more than the delay imposed by the current cell C3. Assuming that there is such a replacement cell, the CRM replaces the current cell C3 with the replacement cell in sample circuit 100.

The CRM then proceeds to level 3. At this level, nodes IN4 and IN9 have assigned TAR's. Thus, the cells C4 and C9 represented by these nodes need to be replaced. For node IN4, the CRM accesses the information pertaining to the cell C4. From this information, the CRM determines a delay imposed by the cell. The CRM then accesses the information pertaining to the replacement cells, and determines whether there is a replacement cell that imposes a delay of 5 ps more than the delay imposed by the current cell C4. Assuming that there is such a replacement cell, the CRM replaces the current cell C4 with the replacement cell in sample circuit 100. Likewise, for node IN9, the CRM accesses the information pertaining to the cell C9. From this information, the CRM determines a delay imposed by the cell. The CRM then accesses the information pertaining to the replacement cells, and determines whether there is a replacement cell that imposes a delay of 10 ps more than the delay imposed by the current cell C9. Assuming that there is such a replacement cell, the CRM replaces the current cell C9 with the replacement cell in sample circuit 100.

The CRM repeats the above cell replacement process for the intervening nodes at levels 4 and 5. In the current example, none of the intervening nodes at levels 4 and 5 have TAR's assigned thereto. Thus, cell replacement does not need to be performed for those levels. Cell replacement is thus completed.

Figure 2F:
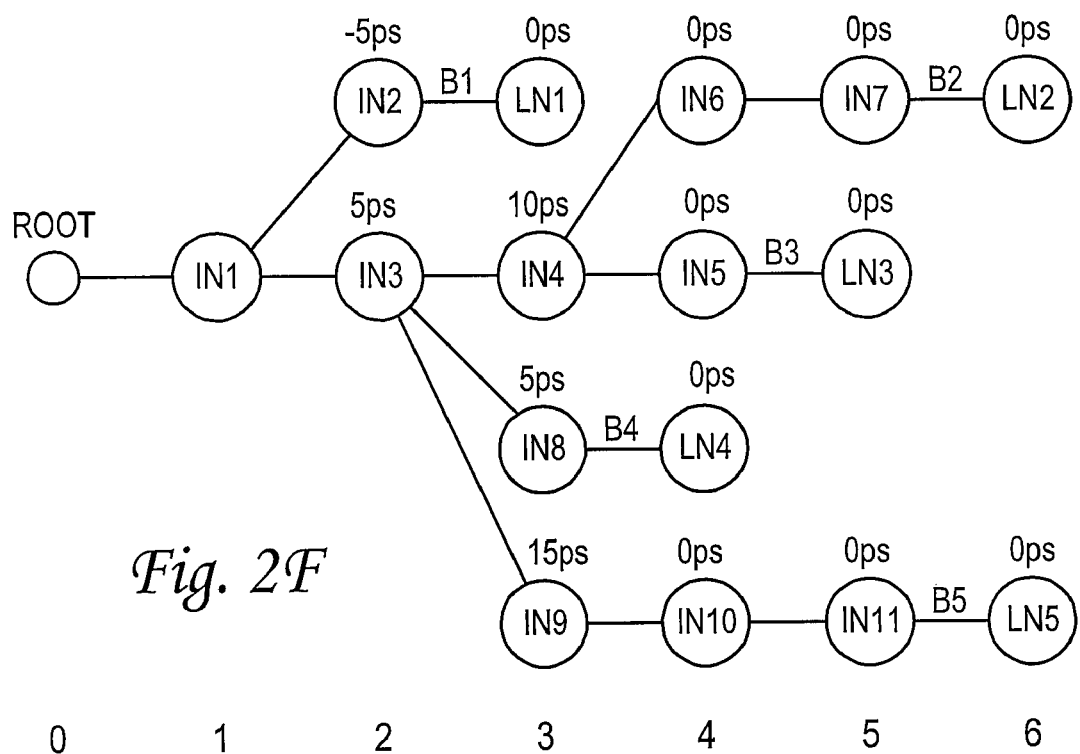

In some instances, it may not be possible for a single cell replacement to satisfy the entire TAR amount that has been assigned to a cell. For example, suppose that there is no available cell that has a 10 ps greater delay than the current cell C3 (represented by node IN3). Thus, it is not possible to replace cell C3 with a replacement cell that satisfies the entire 10 ps of TAR assigned to node IN3. In such a case, in one embodiment, the CRM selects a replacement cell that satisfies as much of the assigned TAR as possible, replaces the cell with the selected replacement cell, and passes the remainder of the TAR assignment downstream to another node. For example, suppose that a replacement cell is available which has a delay that is 5 ps greater than the current cell C3. In such a case, the CRM replaces cell C3 with this replacement cell, and the remaining 5 ps TAR is passed downstream. In the current example, node IN3 is common to branches B3, B4, and B5. Thus, the remaining 5 ps TAR is passed downstream to a node on each of these branches. Specifically, the 5 ps remaining TAR is passed to nodes IN4, IN8, and IN9, as shown in FIG. 2F. After that is done, IN4 will have an assigned TAR of 10 ps, IN8 will have an assigned TAR of 5 ps, and IN9 will have an assigned TAR of 15 ps.

Notice that the passing down of a TAR remainder may cause a cell to be replaced that previously was not identified as being a targeted cell to be replaced. In the above example, node IN8 previously did not have any TAR assigned to it; thus, the cell C8 represented by IN8 was not previously identified as a cell to be replaced. However, since the 5 ps remaining TAR is now being passed down from node IN3 to node IN8, cell C8 is now identified as a cell that needs to be replaced. In such a case, the CRM will replace cell C8 with an appropriate replacement cell, in the manner described above.

Figure 2G:
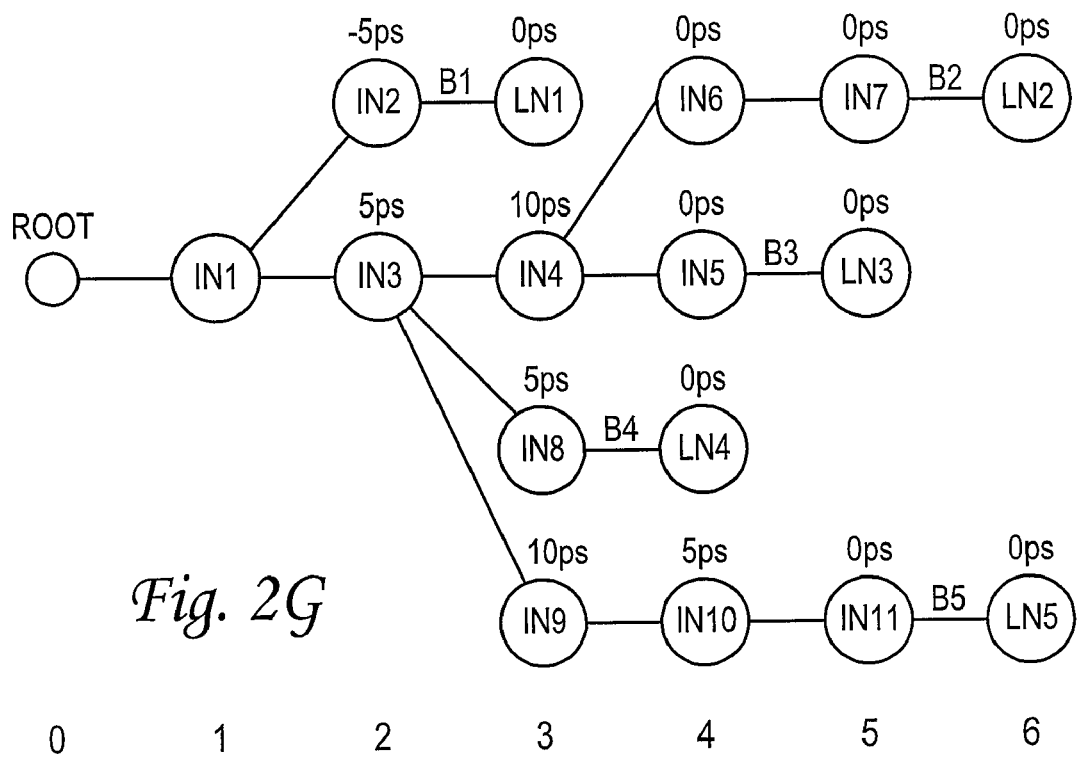

In some instances, the passing down of a remainder TAR may cause further passing down of remainder TAR's. In the above example, 5 ps is passed down from node IN3 to node IN9 such the IN9 now has 15 ps of TAR assigned thereto. Suppose further that there is no available cell that has a 15 ps greater delay than the current cell C9 represented by node IN9. Thus, it is not possible to replace cell C9 with a replacement cell that satisfies the entire 15 ps TAR assignment. Suppose that a replacement cell is available which has a delay that is 10 ps greater than the current cell C9. In such a case, the CRM replaces cell C9 with this replacement cell, and passes the remaining 5 ps of TAR down to node IN10, as shown in FIG. 2G. Because node IN10 now has an assigned TAR, the CRM will replace the cell C10 represented by node IN10 with an appropriate replacement cell, in the manner described above. As this example shows, just as a TAR can be propagated from node to node upstream, they can also be passed from node to node downstream.

In practice, the replacement of one cell with another cell may give rise to more or less delay adjustment than expected. One reason for this is that a cell may change the parasitics of a circuit. In one embodiment, to ensure that the cell replacements in a circuit satisfy all of the TAR's of the circuit, the CRM causes a timing analysis to be performed on the circuit after cell replacement is carried out. The CRM may do this, for example, by using a delay calculation engine or by invoking one or more timing analysis tools. That way, the CRM takes into account the possible interconnect delay impact caused by the cell replacement, as well as the cell delay change. If the revised circuit still violates certain timing requirements, then the violations may be characterized as one or more TAR's, and the above process may be performed on the revised circuit with the new TAR's to further refine the circuit. By doing so, it is ensured that the final circuit actually satisfies all of the necessary timing requirements.

In the manner described above, the CRM is able to systematically and automatically: (1) determine which cells in a circuit should be replaced to satisfy various TAR's; and (2) actually replace the cells with appropriate replacement cells to satisfy the various TAR's. With the approach described above, there is a high likelihood that an optimal replacement scheme will be found which requires the fewest number of cells to be replaced while still satisfying all of the TAR's.

Hardware Overview

Figure 4:
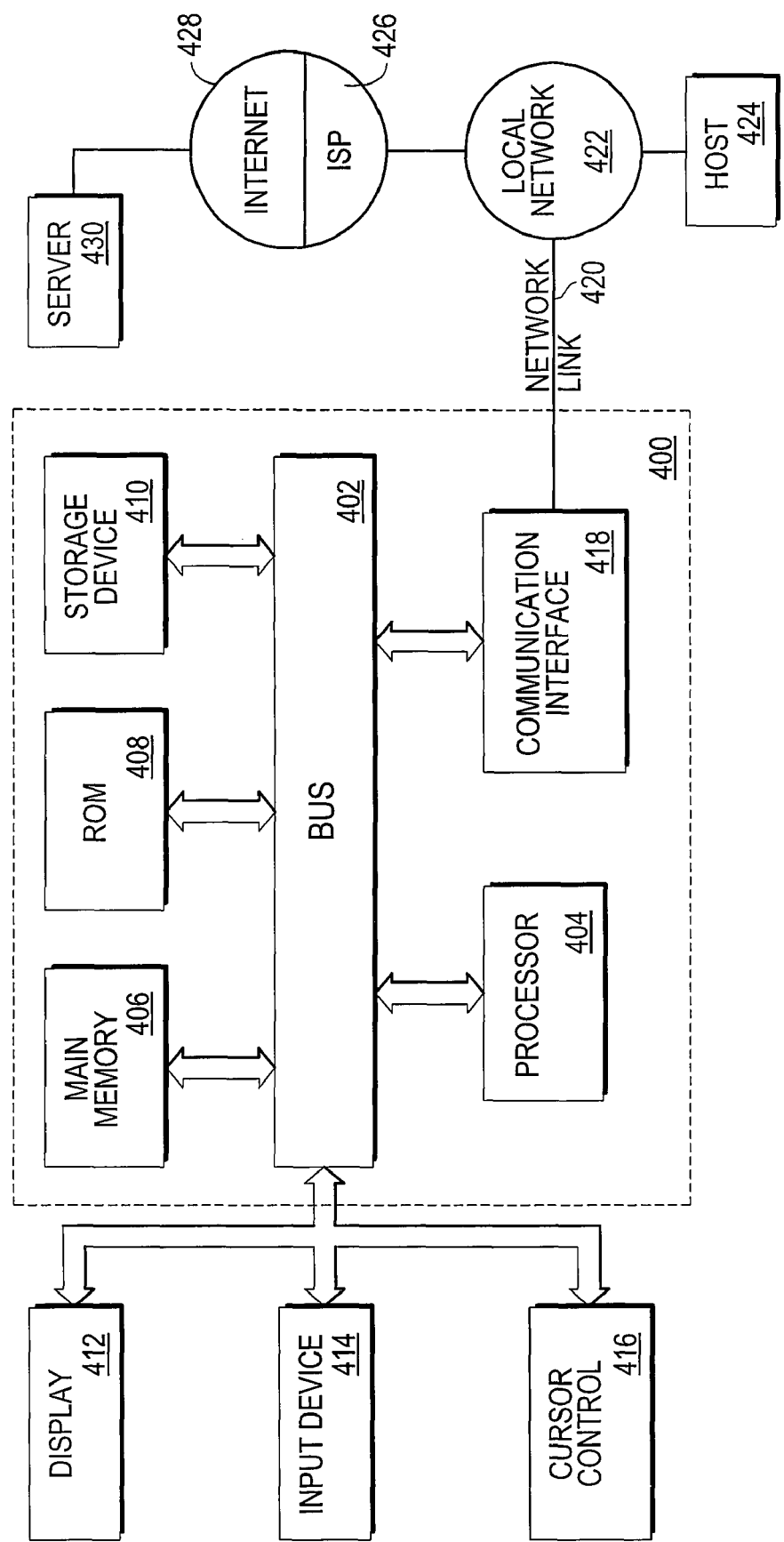
FIG. 4 shows a sample computer system on which one embodiment of the present invention may be implemented.

As noted previously, in one embodiment, the functionality of the CRM may be derived by having one or more processors execute one or more sets of instructions. FIG. 4 shows a block diagram of a computer system 400 in which one embodiment of the CRM may be implemented. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412 for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may further be a network connection that connects one or more of the components. Any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

According to one embodiment of the invention, the technique(s)/approach(es) disclosed herein is/are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable storage medium" as used herein refers to any storage medium that participates in providing data that causes a machine to operation in a specific fashion. In an embodiment implemented using computer system 400, various machine-readable storage media are involved, for example, in providing instructions to processor 404 for execution. Such a storage medium may take many forms, including but not limited to, non-volatile media and volatile media. Non-volatile media includes, for example, optical or magnetic disks, such as storage device 410. Volatile media includes dynamic memory, such as main memory 406.

Common forms of machine-readable storage media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, or any other storage medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method, comprising:

accessing, by a computer processor, a set of information that defines a circuit, wherein the circuit comprises a signal source, a plurality of sinks, one or more cells, and a plurality of paths coupling the signal source to each of the sinks, and wherein at least a subset of the paths comprises one or more of the cells;

constructing, by a computer processor, a tree structure based at least partially upon the circuit, wherein the tree structure has the signal source represented as a root, has each sink represented as a leaf node, has a branch connecting each leaf node to the root such that each branch represents a path, and has each cell in a path represented as an intervening node in a branch, wherein a plurality of the leaf nodes have a corresponding timing adjustment requirement (TAR) associated therewith;

propagating, for at least a particular leaf node having a particular TAR associated therewith, the particular TAR from the particular leaf node towards the root along a particular branch connecting the particular leaf node to the root, assigning at least a portion of the particular TAR to one or more intervening nodes on the particular branch; and replacing, for at least a certain intervening node on the particular branch to which at least a portion of the particular TAR has been assigned, a certain cell in the circuit represented by the certain intervening node with a replacement cell having timing characteristics that satisfy all or part of the at least a portion of the particular TAR that was assigned to the certain intervening node, wherein the at least a portion of the particular TAR that was assigned to the certain intervening node is referred to as a particular TAR amount, and wherein replacing the certain cell further comprises:

selecting a certain replacement cell, wherein the certain replacement cell has timing characteristics that satisfy only a portion of the particular TAR amount, leaving a remainder of the particular TAR amount to be satisfied;

replacing the certain cell in the circuit with the certain replacement cell; and assigning the remainder of the particular TAR amount to a child intervening node as additional TAR to be satisfied by a cell represented by the child intervening node, wherein the child intervening node is an intervening node situated between the certain intervening node and the particular leaf node on the particular branch.

2. The method of claim 1, wherein propagating the particular TAR comprises:

selecting a particular intervening node on the particular branch connecting the particular leaf node to the root;

propagating all or a portion of the particular TAR to the particular intervening node, wherein the all or a portion of the particular TAR that is propagated to the particular intervening node is referred to as a propagated TAR;

selecting a parent intervening node, which is situated between the particular intervening node and the root on the particular branch;

determining whether the parent intervening node is a common node which is common to the particular branch and one or more other branches;

determining a TAR quantity for each of the branches to which the parent intervening node is common in response to a determination that the parent intervening node is a common node, wherein a TAR quantity for a branch indicates how much TAR that branch has to propagate to the parent intervening node;

determining, based at least partially upon the TAR quantities for the branches to which the parent intervening node is common, a certain TAR amount to propagate to the parent intervening node, wherein the certain TAR amount may be none, a portion of, or all of the propagated TAR; and propagating the certain TAR amount to the parent intervening node.

3. The method of claim 2, wherein the certain TAR amount is only a portion of the propagated TAR so that there is a remainder of the propagated TAR that is not propagated to the parent intervening node, and wherein propagating the particular TAR further comprises:

assigning the remainder of the propagated TAR to the particular intervening node.

4. The method of claim 2, wherein propagating the particular TAR further comprises:

propagating all of the propagated TAR to the parent intervening node in response to a determination that the parent intervening node is not a common node.

5. The method of claim 2, wherein determining the certain TAR amount to propagate to the parent intervening node comprises:

determining whether all of the TAR quantities for the branches to which the parent intervening node is common are quantities indicating that additional delay is required;

selecting the TAR quantity that calls for the least amount of addition delay in response to a determination that all of the TAR quantities indicate that additional delay is required; and setting the certain TAR amount based upon the TAR quantity that calls for the least amount of addition delay.

6. The method of claim 2, wherein determining the certain TAR amount to propagate to the parent intervening node comprises:

determining whether all of the TAR quantities for the branches to which the parent intervening node is common are quantities indicating that delay reduction is required;

selecting the TAR quantity that calls for the least amount of delay reduction in response to a determination that all of the TAR quantities indicate that delay reduction is required; and setting the certain TAR amount based upon the TAR quantity that calls for the least amount of delay reduction.

7. The method of claim 2, wherein determining the certain TAR amount to propagate to the parent intervening node comprises:

determining whether one or more of the TAR quantities for the branches to which the parent intervening node is common indicate that additional delay is required while one or more other of the TAR quantities indicate that delay reduction is required;

setting the certain TAR amount to a value that causes no TAR amount to be propagated to the parent intervening node in response to a determination that one or more of the TAR quantities indicate that additional delay is required while one or more other of the TAR quantities indicate that delay reduction is required.

8. The method of claim 1, wherein replacing the certain cell further comprises:

determining that the certain intervening node is a common node which is common to the particular branch and another branch which connects another leaf node to the root; and assigning the remainder of the particular TAR amount to another child intervening node as additional TAR to be satisfied by a cell represented by the other child intervening node, wherein the other child intervening node is an intervening node situated between the certain intervening node and the other leaf node on the other branch.

9. The method of claim 1, wherein the tree structure comprises a first leaf node connected to the root by a first branch, wherein the first leaf node has a first TAR associated therewith, and wherein the first TAR can indicate that additional delay is required by the first leaf node on the first branch or that delay reduction is required by the first leaf node on the first branch.

10. The method of claim 1, wherein the tree structure comprises a first leaf node having a first TAR associated therewith and a second leaf node having a second TAR associated therewith, wherein the first TAR indicates that addition delay is required by the first leaf node, and wherein the second TAR indicates that delay reduction is required by the second leaf node.

11. The method of claim 1, further comprising:
performing a timing analysis on the revised circuit to determining whether one or more timing requirements are satisfied after one or more cells in the circuit have been replaced with one or more replacement cells to derive a revised circuit.

12. A non-transitory machine readable storage medium, comprising instructions which, when executed by one or more processors, cause the one or more processors to perform a method, the method comprising:
accessing, by a computer processor, a set of information that defines a circuit, wherein the circuit comprises a signal source, a plurality of sinks, one or more cells, and a plurality of paths coupling the signal source to each of the sinks, and wherein at least a subset of the paths comprises one or more of the cells;
constructing, by a computer processor, a tree structure based at least partially upon the circuit, wherein the tree structure has the signal source represented as a root, has each sink represented as a leaf node, has a branch connecting each leaf node to the root such that each branch represents a path, and has each cell in a path represented as an intervening node in a branch, wherein a plurality of the leaf nodes have a corresponding timing adjustment requirement (TAR) associated therewith;
propagating, for at least a particular leaf node having a particular TAR associated therewith, the particular TAR from the particular leaf node towards the root along a particular branch connecting the particular leaf node to the root, assigning at least a portion of the particular TAR to one or more intervening nodes on the particular branch; and
replacing, for at least a certain intervening node on the particular branch to which at least a portion of the particular TAR has been assigned, a certain cell in the circuit represented by the certain intervening node with a replacement cell having timing characteristics that satisfy all or part of the at least a portion of the particular TAR that was assigned to the certain intervening node, wherein the at least a portion of the particular TAR that was assigned to the certain intervening node is referred to as a particular TAR amount, and
wherein replacing the certain cell further comprises:
selecting a certain replacement cell, wherein the certain replacement cell has timing characteristics that satisfy only a portion of the particular TAR amount, leaving a remainder of the particular TAR amount to be satisfied;
replacing the certain cell in the circuit with the certain replacement cell; and
assigning the remainder of the particular TAR amount to a child intervening node as additional TAR to be satisfied by a cell represented by the child intervening node, wherein the child intervening node is an intervening node situated between the certain intervening node and the particular leaf node on the particular branch.

13. The non-transitory machine readable storage medium of claim 12, wherein propagating the particular TAR comprises:
selecting a particular intervening node on the particular branch connecting the particular leaf node to the root;
propagating all or a portion of the particular TAR to the particular intervening node, wherein the all or a portion of the particular TAR that is propagated to the particular intervening node is referred to as a propagated TAR;
selecting a parent intervening node, which is situated between the particular intervening node and the root on the particular branch;
determining whether the parent intervening node is a common node which is common to the particular branch and one or more other branches;
determining a TAR quantity for each of the branches to which the parent intervening node is common in response to a determination that the parent intervening node is a common node, wherein a TAR quantity for a branch indicates how much TAR that branch has to propagate to the parent intervening node;
determining, based at least partially upon the TAR quantities for the branches to which the parent intervening node is common, a certain TAR amount to propagate to the parent intervening node, wherein the certain TAR amount may be none, a portion of, or all of the propagated TAR; and
propagating the certain TAR amount to the parent intervening node.

14. The non-transitory machine readable storage medium of claim 13, wherein the certain TAR amount is only a portion of the propagated TAR so that there is a remainder of the propagated TAR that is not propagated to the parent intervening node, and wherein propagating the particular TAR further comprises:
assigning the remainder of the propagated TAR to the particular intervening node.

15. The non-transitory machine readable storage medium of claim 12, wherein replacing the certain cell further comprises:
determining that the certain intervening node is a common node which is common to the particular branch and another branch which connects another leaf node to the root; and
assigning the remainder of the particular TAR amount to another child intervening node as additional TAR to be satisfied by a cell represented by the other child intervening node, wherein the other child intervening node is an intervening node situated between the certain intervening node and the other leaf node on the other branch.

16. The non-transitory machine readable storage medium of claim 12, wherein the tree structure comprises a first leaf node connected to the root by a first branch, wherein the first leaf node has a first TAR associated therewith, and wherein the first TAR can indicate that additional delay is required by the first leaf node on the first branch or that delay reduction is required by the first leaf node on the first branch.

17. The non-transitory machine readable storage medium of claim 12, wherein the tree structure comprises a first leaf node having a first TAR associated therewith and a second leaf node having a second TAR associated therewith, wherein the first TAR indicates that addition delay is required by the first leaf node, and wherein the second TAR indicates that delay reduction is required by the second leaf node.

18. A system comprising:
one or more processors; and
a non-transitory storage medium coupled to the one or more processors, the non-transitory storage medium comprising instructions which, when executed by the one or more processors, cause the one or more processors to perform the steps:
accessing, by a computer processor, a set of information that defines a circuit, wherein the circuit comprises a signal source, a plurality of sinks, one or more cells, and a plurality of paths coupling the signal source to each of the sinks, and wherein at least a subset of the paths comprises one or more of the cells;

constructing, by a computer processor, a tree structure based at least partially upon the circuit, wherein the tree structure has the signal source represented as a root, has each sink represented as a leaf node, has a branch connecting each leaf node to the root such that each branch represents a path, and has each cell in a path represented as an intervening node in a branch, wherein a plurality of the leaf nodes have a corresponding timing adjustment requirement (TAR) associated therewith;

propagating, for at least a particular leaf node having a particular TAR associated therewith, the particular TAR from the particular leaf node towards the root along a particular branch connecting the particular leaf node to the root, assigning at least a portion of the particular TAR to one or more intervening nodes on the particular branch; and replacing, for at least a certain intervening node on the particular branch to which at least a portion of the particular TAR has been assigned, a certain cell in the circuit represented by the certain intervening node with a replacement cell having timing characteristics that satisfy all or part of the at least a portion of the particular TAR that was assigned to the certain intervening node, wherein the at least a portion of the particular TAR that was assigned to the certain intervening node is referred to as a particular TAR amount, and wherein replacing the certain cell further comprises:

selecting a certain replacement cell wherein the certain replacement cell has timing characteristics that satisfy only a portion of the particular TAR amount, leaving a remainder of the particular TAR amount to be satisfied;

replacing the certain cell in the circuit with the certain replacement cell; and assigning the remainder of the particular TAR amount to a child intervening node as additional TAR to be satisfied by a cell represented by the child intervening node, wherein the child intervening node is an intervening node situated between the certain intervening node and the particular leaf node on the particular branch.

* * * * *